(12) United States Patent
Petridis et al.

(10) Patent No.: US 9,569,967 B2
(45) Date of Patent: Feb. 14, 2017

(54) COLLISION WARNING FOR A VEHICLE (71) Applicant: FORD GLOBAL TECHNOLOGIES, LLC, Dearborn, MI (US)

(72) Inventors: Anthemios Philemon Petridis, Herts (GB); David Hesketh, Ingatestone (GB)

(73) Assignee: FORD GLOBAL TECHNOLOGIES LLC, Dearborn, MI (US)

( * ) Notice: Subject to any disclaimer, the term of this patent is extended or adjusted under 35 U.S.C. 154(b) by 0 days.

(21) Appl. No.: 14/483,562

(22) Filed: Sep. 11, 2014

(65) Prior Publication Data

US 2015/0073664 A1 Mar. 12, 2015

(30) Foreign Application Priority Data

Sep. 12, 2013 (GB) .................................. 1316265.6

(51) Int. Cl.
*G08G 1/16* (2006.01)
*B60W 30/095* (2012.01)

(52) U.S. Cl.
CPC .............. *G08G 1/16* (2013.01); *B60W 30/095* (2013.01); *G08G 1/165* (2013.01)

(58) Field of Classification Search
CPC .... B60W 30/08; B60W 30/10; B60W 30/095; G08G 1/165; G08G 1/16
See application file for complete search history.

(56) References Cited

U.S. PATENT DOCUMENTS

| 2009/0024357 A1* | 1/2009 | Aso et al. ...................... 702/181 |
| 2014/0278059 A1* | 9/2014 | Gunther ............ G01C 21/3655 701/414 |

FOREIGN PATENT DOCUMENTS

| DE | 10307229 A1 | 4/2004 |
| EP | 1447271 A2 | 8/2004 |

OTHER PUBLICATIONS

United Kingdom Intellectual Property Office, Search Report for the corresponding Great Britain Patent Application No. GB1316265.6 mailed May 1, 2014.

* cited by examiner

*Primary Examiner* — Basil T Jos
(74) *Attorney, Agent, or Firm* — Frank MacKenzie; Brooks Kushman P.C.

(57) ABSTRACT

A method and apparatus for warning a driver of a motor vehicle of a predicted collision with a stationary object. A proximity sensor is used to determine a position of an obstacle relative to the vehicle. A steering angle of the vehicle is determined and used to predict a trajectory of the vehicle. A collision zone on the vehicle is identified based on the vehicle trajectory, the collision zone being that spot or location on the vehicle which is predicted to contact the obstacle. A visual display within the vehicle (on the control panel, for example) provides a visual indication to the driver of the position of the collision zone on the vehicle and a predicted trajectory of the collision zone as the vehicle moves in accordance with the steering angle.

20 Claims, 4 Drawing Sheets

COLLISION WARNING FOR A VEHICLE

CROSS-REFERENCE TO RELATED APPLICATIONS

This application claims foreign priority benefits under 35 U.S.C. §119(a)-(d) to GB 1316265.6 filed Sep. 12, 2013, which is hereby incorporated by reference in its entirety.

TECHNICAL FIELD

The invention relates in general to a method and apparatus for providing a driver of a motor vehicle with a visual warning of a predicted collision with a stationary object.

BACKGROUND

Parking aids are known which warn the driver of a vehicle of objects which are too near to the front and/or rear of the vehicle. In such systems, proximity sensors are typically mounted in the front and/or rear bumpers. When an object is detected close to the front or rear of the vehicle, an audible alarm, typically a beeper, is sounded. As the vehicle gets closer to the detected object, the frequency of the beeper increases until the object is at a predefined distance from the vehicle, at which point a continuous alarm is sounded.

There are several problems with these known parking aids systems. When the vehicle is close to a detected object, a continuous audible alarm is sounded and the driver is not able to determine whether an actual collision is imminent. Further, in some situations, for example when simply passing objects which are very close to the front or rear side of the vehicle, a continuous warning is provided when there is no risk of collision. A further drawback is that traditional parking aid systems do not detect obstacles located to the side of the vehicle and therefore are not able to provide lateral collision warnings.

It is also known to provide a camera mounted on the rear of a vehicle and to display the image from the camera on a display screen on the dashboard of the vehicle. This allows the driver to view obstacles to the rear of the vehicle. It is also known to predict the trajectory of a vehicle based on the instantaneous steering wheel angle and superimpose a predicted trajectory path onto the camera picture on the display screen. This allows the driver to see, for a given steering angle, where the vehicle will travel. With such camera display systems, the driver must interpret the image on the screen in order to assess whether a given trajectory will result in a collision.

SUMMARY

According to the present invention there is provided a method of providing a collision warning for a driver-controlled vehicle comprising the steps of:

a) storing data relating to the geometry of a side of the vehicle;
b) receiving data from at least one sensor for detecting an obstacle in the proximity of the vehicle;
c) storing a position of the detected obstacle relative to the vehicle;
d) measuring or inferring the instantaneous steering angle of at least one wheel of the vehicle;
e) predicting the trajectory of the side of the vehicle based on the geometry of the side of the vehicle and the instantaneous steering angle;
f) determining whether any part of the side of the vehicle will collide with the detected obstacle based on the predicted trajectory of the side of the vehicle and the stored position of the detected obstacle;
g) calculating a position of a predicted collision zone on at least one of: the side of the vehicle and the detected obstacle;
h) providing a visual indication to a driver of the vehicle of the trajectory of the vehicle relative to the detected obstacle; and
i) if the predicted trajectory of the side of the vehicle will result in a collision, providing a visual indication of the position of the predicted collision zone on at least one of: side of the vehicle and the position of the predicted collision zone on the detected obstacle.

The data stored relating to the geometry of the side of the vehicle may include, for example, width, length, wheel spacing, vehicle panel profiles.

The method may further comprise sensing or inferring the currently selected gear; and predicting the trajectory of the side of the vehicle also based on the currently selected gear.

The steering angle may be measured or inferred by sensing the position of a component of the steering assembly of the vehicle In step (h) the trajectory of the vehicle may be calculated by determining the path of the first point of impact on the side of the vehicle. Alternatively, the trajectory of the vehicle may be calculated by determining the path of the worst-case trajectory of a defined position on the side of the vehicle, such as the front side fender or rear side fender.

The step of providing the visual indication may further include:

providing a plan view of the vehicle; and
superimposing the path of the predicted trajectory of the vehicle on the plan view of the vehicle.

The plan view of the vehicle may be provided as a graphical representation on a digital display screen. The plan view of the vehicle may be generated from data received from at least one camera on the vehicle. The camera may also function as a proximity sensor. The data received from the at least one camera may be combined or overlaid with graphical representations. Alternatively, the plan view of the vehicle may be generated from stored data.

Alternatively, or in addition, the visual indication may be provided via a head-up display projected onto the windscreen of the vehicle.

The method may further comprise providing an audible warning indication, for example, in the form of a beeper, a voice message indicating the predicted collision location, or any other suitable audible tone to alert the driver. Such a collision warning may not always be required by the driver. It may be appropriate only to provide the collision warning when the driver is performing a slow-moving maneuver, such as for example, a parking maneuver, reversing around a corner, or driving around obstacles, such as gate posts or bollards.

Accordingly, there is also provided a method of operating a driver-controlled vehicle comprising the steps of:

monitoring the driving conditions of the vehicle,
determining that the provision of a collision warning is appropriate; and
providing the collision warning in accordance with the method of any preceding claim for at least one lateral side of the vehicle.

Monitoring the driving conditions of the vehicle may involve monitoring data such as, for example, engine speed, road speed, currently selected transmission gear, accelerator pedal position, steering wheel angle or any combination of these parameters.

The determination of whether a collision warning is appropriate may be carried out by, for example, analyzing the current driving speed of the vehicle and the currently selected gear, and determining whether the vehicle is carrying out a parking or other slow moving maneuver. The output from the at least one proximity sensor may also be used to determine whether it is appropriate to provide a collision warning.

Alternatively, or in addition, the method may monitor a signal from a user interface, such as a button or touch-screen input, whereby the user interface allows the driver to switch on and off the collision warning. In this case, the determination of whether a collision warning is appropriate takes into account the driver's selection.

The step of providing the collision warning may be carried out for one or both lateral sides of the vehicle. The step of providing the collision warning may also be carried out on one or more other areas of the vehicle such as the front, rear, underside or roof of the vehicle.

According to the present invention, there is also provided a collision warning apparatus in a driver-controlled vehicle comprising:
 a memory for storing data relating to the geometry of a side of the vehicle;
 at least one proximity sensor for detecting obstacles in the proximity of the vehicle;
 a memory for storing a position of a detected obstacle relative to the vehicle;
 a device for measuring or inferring the instantaneous steering angle of at least one wheel of the vehicle;
 a control device configured to:
 predict the trajectory of the side of the vehicle based on the geometry of the side of the vehicle and the instantaneous steering angle;
 determine whether any part of the side of the vehicle will collide with the detected obstacle based on the predicted trajectory of the side of the vehicle and the stored position of the detected obstacle; and
 calculate a position of a predicted collision zone on at least one of: the side of the vehicle and the detected obstacle ; and
 a collision warning device comprising visual display device configured to indicate:
 the trajectory of the side of the vehicle relative to the detected object; and
 at least one of: the position of the predicted collision zone on the side of the vehicle, and the position of the predicted collision zone on the detected obstacle.

The apparatus may further comprise a device for determining the currently selected gear of a vehicle transmission. The control device may be further configured to predict the trajectory of the side of the vehicle based on the geometry of the side of the vehicle, the instantaneous steering angle and the currently selected transmission gear.

The apparatus may include at least one proximity sensor provided on each lateral side of the vehicle. Alternatively, a plurality of proximity sensors may be provided on each lateral side of the vehicle.

The apparatus may further include at least one proximity sensor provided on the front of the vehicle. Alternatively, or in addition, at least one proximity sensor may be provided on the rear and/or the roof of the vehicle.

The at least one proximity sensor may be a sonar-based sensor, a camera-based sensor, or any other type of sensor capable of detecting the proximity of an object.

The visual display device may comprise a display screen on a dashboard.

The display screen may be a digital display screen configured to display a plan view of the vehicle. The display screen may indicate at least one of the position of the predicted collision zone on the side of the vehicle, and the position of the predicted collision zone on the detected obstacle. The trajectory of the side of the vehicle and the predicted collision zone may be superimposed on the plan view of the vehicle.

The visual display device may indicate the trajectory of the vehicle as defined by the path of the first point of impact on the side of the vehicle. Alternatively, the trajectory of the vehicle may be defined by the path of the worst-case trajectory of a defined position on the side of the vehicle, or the path of the vehicle body.

Alternatively, or in addition, the visual indication may be a head-up display which is projected onto the windscreen of the vehicle.

The collision warning device may further comprise an audible collision warning device, such as a beeper or any other sound generating device which provides an audible tone to alert the driver. Alternatively, the audible warning device may be configured to provide a voice message indicating the position of the predicted collision zone.

The device for measuring or inferring the instantaneous steering angle may be a sensor for sensing the position of a component of the steering assembly, such as the steering wheel or the steering rack. Alternatively, the device may be a sensor provided on or linked to one of the driven wheels in order to sense the position of a component of the wheel assembly and/or determine the angle through which said wheel has been turned.

The apparatus may further include a user interface, such as a button, a switch or a touch-screen input, which allows the driver to manually switch on and off the collision warning.

The invention provides a collision warning system which combines information from proximity sensors, such as sonar-based detectors and/or cameras, with predicted trajectory to provide a collision warning to the driver only when a collision is likely to occur, rather than all the time that the vehicle is near a detected obstacle.

Further, in the collision warning system of the invention, the position of detected objects is stored and updated as the vehicle moves, and therefore the position of detected objects in the proximity of the vehicle is known, even when they move out of range of the proximity sensors. Accordingly, when the system is active, the driver is provided with a continually updated and accurate visual indication of any obstacles in the proximity of the vehicle.

In addition to, or instead of the lateral collision warning described by the embodiments above, proximity sensors may also be provided elsewhere on the vehicle such as on the front and/or rear of the vehicle and the above described collision warning and visual indication may also be carried out for the front and/or rear of the vehicle. Furthermore, the system could be applied to preventing collision damage to the vehicle roof (such as might occur in a low building such as a garage or covered car park), using proximity sensors and/or cameras in the manner described in relation to previous embodiments. In this way, the system is capable of measuring or inferring the clearance between an overhead obstacle and the vehicle roof and providing a visual indication of a possible impact zone on the roof and/or on the obstacle. The system may also provide an audible warning, such as when the clearance is below a predetermined threshold value.

For a better understanding of the present disclosure, and to show more clearly how it may be carried into effect, reference will now be made, by way of example, to the accompanying drawings in which.

BRIEF DESCRIPTION OF THE DRAWINGS

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
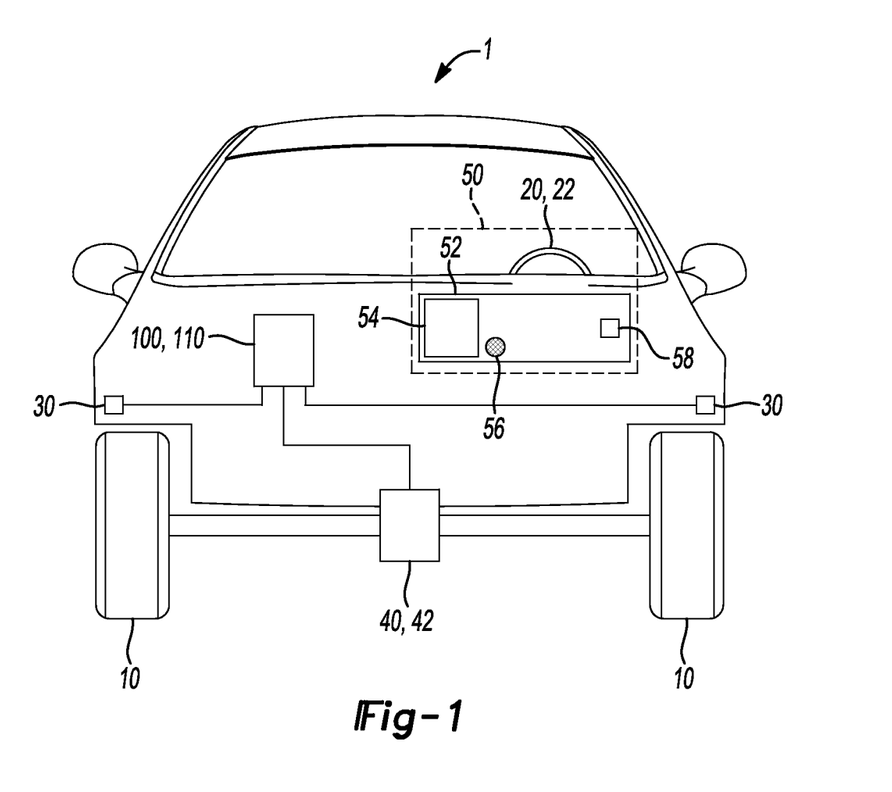
FIG. 1 shows in schematic form, a driver-controlled vehicle, such as a passenger car.

FIG. 1 shows a driver-controlled vehicle, such as a passenger car 1, including a schematic representation of the features of the vehicle which are relevant to the present invention. The location of these features within the vehicle is not limited by the schematic representation in FIG. 1.

The car 1 includes: wheels 10; a steering wheel assembly 20 having a steering wheel angle sensor 22; a gear box or transmission 40 having a device 42 for determining the currently selected transmission setting or gear; a control device 100 having a memory 110 for storing data; and a driver interface 50. Proximity sensors 30 are provided on both lateral sides of the car. The driver interface 50 includes a dashboard 52 having: a visual display screen 54, a beeper or other sound generating device 56 and a collision warning selection button 58.

A steering wheel angle sensor 22 is provided on or adjacent to a component of the steering wheel assembly 20. The sensor 22 senses the position of the component of the steering wheel assembly, and using this data the control device 100 infers the instantaneous angle through which the steering wheel is turned in a clockwise or counter-clockwise direction. The position of the steering wheel at which the vehicle will travel directly forwards or backwards in a straight line is defined as a steering wheel angle of zero.

One or more proximity sensors 30 are provided on each lateral side of the vehicle. The proximity sensors 30 detect obstacles to the side of the vehicle and provide a signal to the control device 100 indicating the distance to the detected obstacle. The position of the detected obstacle relative to the vehicle is stored in the control device memory 110.

The visual display screen 54 provides a graphical representation of the vehicle and the position of any predicted collision zones, and will be described in more detail below.

The beeper 56 provides an alarm to provide an audible collision warning indication to the driver. Alternatively, a sound generating device 56 can give verbal instructions indicating the location of the predicted collision zone, for example by detailing which body panel of the vehicle the predicted collision zone is on.

The operation of the collision warning apparatus according to one embodiment of the invention will now be described with reference to FIG. 1, the process flowchart of FIG. 2 and the collision warning visual display screen of FIGS. 3 and 4.

Figure 2:
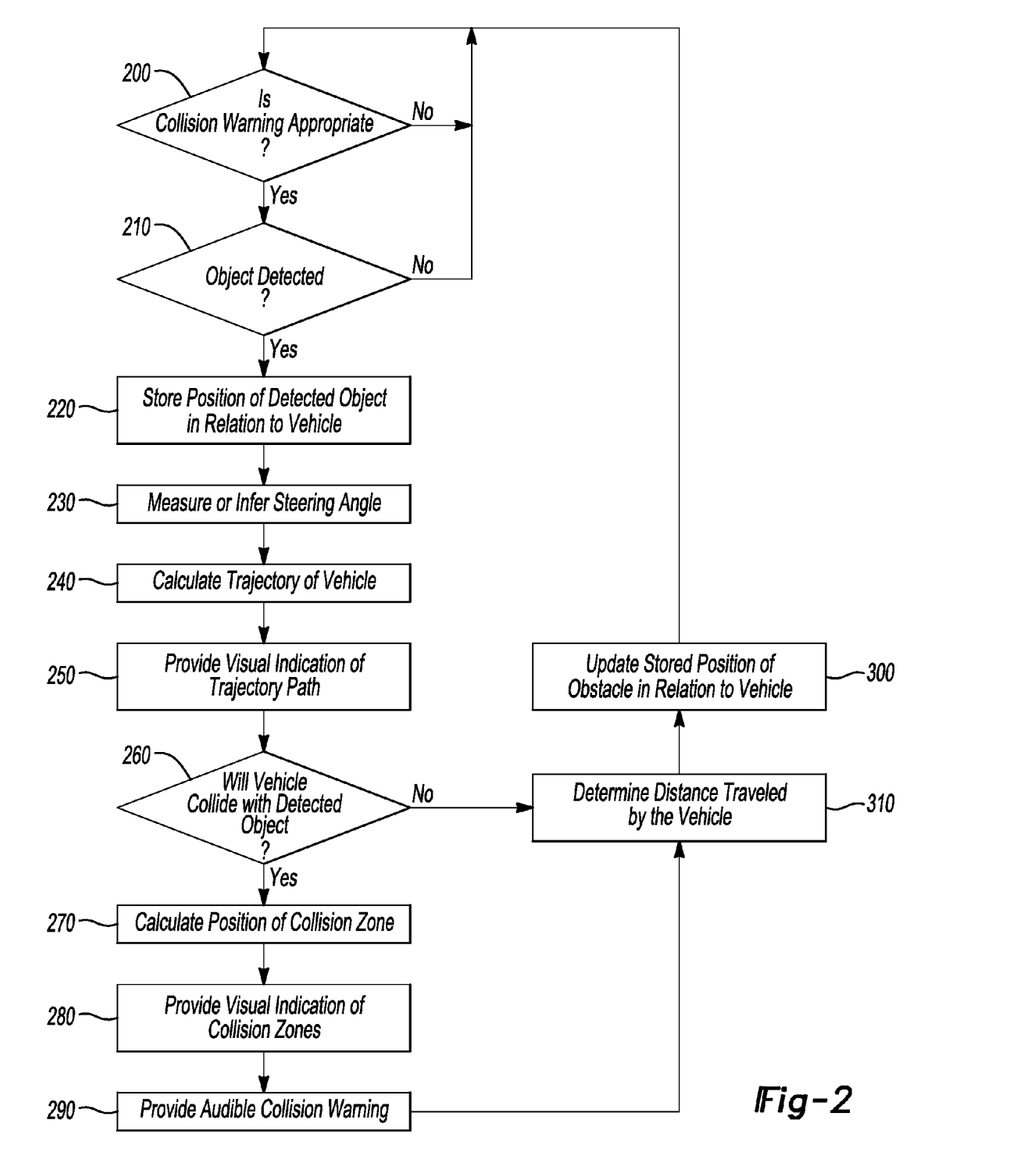
FIG. 2 shows a process flow chart representing a method of operating the vehicle of FIG. 1.

The control device 100 monitors the driving conditions of the vehicle in order to determine whether it is appropriate to provide a collision warning to the driver (FIG. 2, step 200).

The determination of whether a collision warning is appropriate may be carried out by, for example, analyzing the current driving speed of the vehicle and the currently selected gear of the vehicle transmission, and determining whether the vehicle is carrying out a parking or other slow moving maneuver. In one possible mode, if the vehicle transmission is in first gear or reverse gear, the control device 100 determines that that the vehicle is being parked or maneuvered slowly, so the collision warning system should be operating. If the vehicle is moving slowly but the transmission is in second gear or above, the control device 100 determines that it is just driving slowly in traffic or being driven carefully in hazardous driving conditions, such as on a slippery road or in fog or heavy rain, so the collision warning system should be switched off so the driver is not distracted.

The control device 100 also monitors a signal from the collision warning button 58 to determine whether the driver has manually switched the collision warning system on or off.

When the collision warning system is activated, the proximity sensors 30 on the lateral sides of the vehicle 1 are used to detect obstacles in the proximity of the vehicle.

When an obstacle is detected (step 210, "YES"), the position of the detected obstacle in relation to the vehicle is stored in the memory 110 of the control device 100 (step 220). As the vehicle moves forward or backwards, the distance travelled by the vehicle is determined (step 310) and the control device 100 recalculates the position of the detected object relative to the current position of the vehicle and the stored position of the obstacle is updated (step 300). In this way, the position of a detected object in the proximity of the vehicle is known, even when it has moved out of range of the proximity sensors 30 provided on the vehicle.

Using the currently selected gear, the control device 100 determines the driving direction of the vehicle, i.e. if a forward gear is selected then the vehicle will travel forwards and if a reverse gear is selected the vehicle will travel backwards. If the vehicle is in a neutral gear or park, the control device 100 may determine a default direction, for example forwards. Alternatively, data from proximity sensors at the front or rear of the vehicle (not shown) can be used to determine a driving direction, i.e. if obstacles are detected close to the front of the vehicle, the control device 100 may determine that the vehicle will travel backwards.

The control device 100 predicts the trajectory of the vehicle with a trajectory prediction algorithm using the instantaneous steering angle, the stored geometry data of the vehicle and the currently selected gear (step 240).

The control device 100 uses the predicted trajectory of the vehicle and the stored position of the detected obstacle to determine whether any part of the vehicle will collide with the detected obstacle (step 260). If a collision will result (step 260, "YES"), the position of the predicted collision zone on the side of the vehicle and the position of the predicted collision zone on the detected obstacle may be calculated (step 270).

If an object has been detected in the proximity of the vehicle, but no collision will occur with the current predicted trajectory, the control device 100 provides a visual indication of the predicted trajectory of the vehicle and the position of the detected object in relation to a plan view of the vehicle (step 250).

Figure 3:
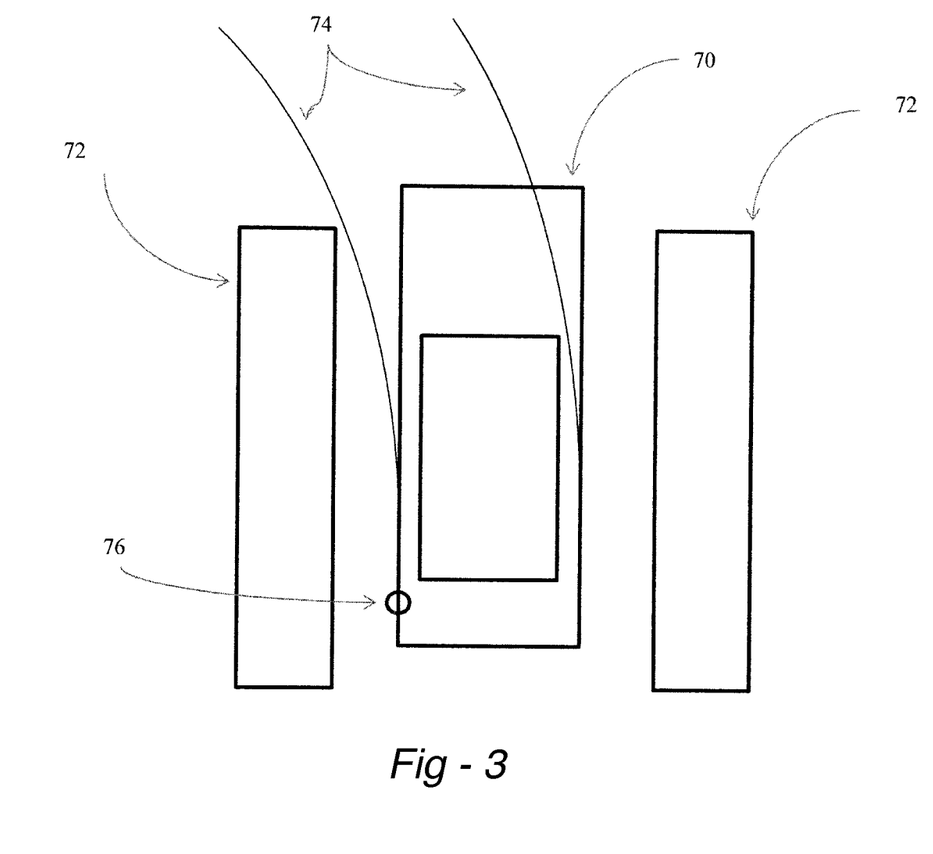
FIG. 3 shows in schematic form an embodiment of the collision warning visual display in the vehicle of FIG. 1.

FIG. 3 shows an embodiment of the digital display screen 54 visual indication when objects are detected, but no collision will occur. This corresponds to a situation where a vehicle is driving forward out of a parking space or driving between two objects. The visual indication includes a plan view of the vehicle 70, the positions of the detected obstacles 72 in relation to the vehicle and the predicted trajectory path 74. In this embodiment, the trajectory path 74 displayed is that of the part of the vehicle which will pass closest to the detected object with the current instantaneous steering angle. The position of the part of the vehicle that will pass closest to the detected objected may also be highlighted 76. In practice, the visual indication can be further enhanced with color, graphics or any suitable visual means.

If one or more objects have been detected in proximity to the vehicle and a collision will occur with the current predicted trajectory, the control device 100 provides a visual indication of: the predicted trajectory of the vehicle in relation to a plan view of the vehicle; the position of the detected object in relation to a plan view of the vehicle; and the position of the predicted collision zones on the vehicle and the obstacle.

If the control device 100 has predicted a collision, the beeper or other audible warning device 56 is sounded (step 290). This will alert the driver and prompt him or her to check the display screen 54.

Figure 4:
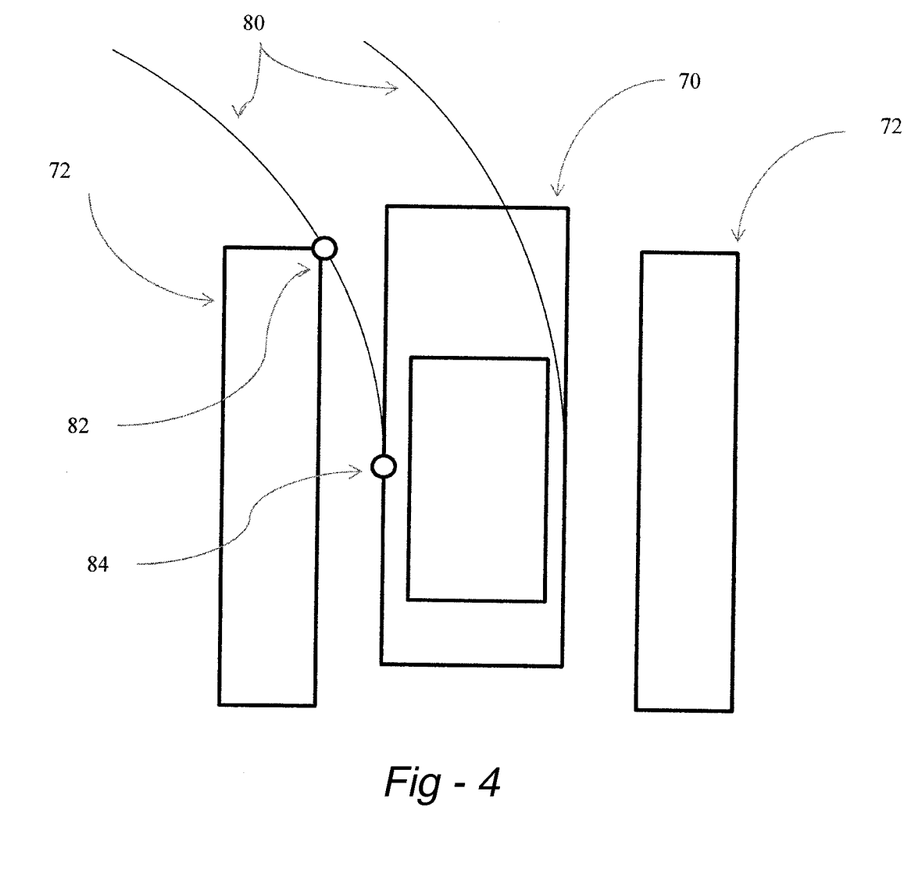
FIG. 4 shows in schematic form the collision warning visual display in an alternative display mode.

FIG. 4 shows an embodiment of the digital display screen 54 displaying a visual indication in which objects are detected and a collision will occur. This corresponds to the same situation as shown in the previous figure, i.e. where a vehicle is driving forward out of a parking space or driving between two objects. The visual indication includes a plan view of the vehicle 70, the positions of the detected obstacles 72 in relation to the vehicle and the predicted trajectory path 80. In this embodiment, the trajectory path 80 displayed is that of the path of the first point of impact on the side of the vehicle. The position of the predicted collision zones on the obstacle 82 and the position of the predicted collision zones on the vehicle 84 are highlighted. In practice, the visual indication can be further enhanced with color, graphics or any suitable visual means.

As the driver turns the steering wheel 20, the instantaneous steering wheel angle changes and the control device 100 revises the predicted trajectory of the vehicle. For the revised predicted trajectory, the control device 100 determines whether any part of the vehicle will collide with the detected obstacle. The visual indication is updated to provide a revised collision warning indication. If the driver moves the steering wheel 20 from left to right, the predicted trajectory will be updated accordingly and the trajectory path lines on the display screen 54 will follow the movement and will sweep left to right The collision warning system allows the driver to monitor the display screen 54 and adjust the steering wheel 20 accordingly until no collision zones are shown and then proceed to drive.

For example, when a driver is driving forward out of a parking space or moving between two obstacles, if the steering wheel 20 is turned by a significant amount to the left, the collision warning system will determine that the rear wheels of the vehicle take a shorter route than the front wheels. This means that the front of the left-hand obstacle obstructs the expected path followed by the vehicle and there is a risk of hitting or scraping the obstacle with the side of the vehicle. FIG. 4 shows the display screen 54 indicating that such a collision will occur. The driver can then reduce the amount that the steering wheel 20 is turned in order to change the trajectory of the vehicle and avoid the obstacle.

Once the vehicle has travelled half way between the obstacles, there is a risk that an unskilled driver may apply increased steering lock, thinking that the whole vehicle will still pass thorough. With the collision warning system of the invention, the driver will be warned that a collision will occur and can correct the steering accordingly.

Alternative Embodiments

In the embodiment described above, a steering wheel angle sensor is provided, and the output from this sensor is used to infer the instantaneous steering angle of the driven wheel of the car. Alternatively, one or more sensors can be provided on or linked to another component of the steering assembly. For example, a sensor could be mounted on the steering rack or could be associated with at least one of the driven wheels of the car to sense the position of a component of the wheel assembly and/or determine the angle through which the wheel has been turned. For example, a sensor could be provided on or directed towards one or both of the front wheels.

In addition to the lateral collision warning described by the embodiment above, proximity sensors may also be provided elsewhere on the vehicle such as on the front and/or rear of the vehicle and the above described collision warning and visual indication may also be carried out for the front and/or rear of the vehicle. Furthermore, the system could be expanded to prevent collision damage to the vehicle roof (such as might occur in a low building such as a garage or covered car park), using proximity sensors and/or cameras in the manner described in relation to previous embodiments. In this way, the system is capable of measuring or inferring the clearance between an overhead obstacle and the vehicle roof and providing a visual indication of a possible impact zone on the roof and/or on the obstacle. The system may also provide an audible warning, such as when the clearance is below a predetermined threshold value.

In an alternative to, or in addition to, the sensors of the embodiments described above, the vehicle can be provided with one or more cameras, which may for example be positioned along the lateral sides of the vehicle. The digital images received from the or each camera can be used alone or in combination with the sensors to generate the visual indication of the predicted collision zone on the side of the vehicle, and/or the position of the predicted collision zone on the detected obstacle.

In the embodiments described above, the collision warning device comprises a visual display screen located on the dashboard of the vehicle. Alternatively, or in addition, the collision may be provided on a head-up display which is projected onto the windscreen of the vehicle.

In the embodiments described above, when a collision is indicated, the visual display may indicate a trajectory of the vehicle which is defined by the path of the first point of impact on the side of the vehicle. Alternatively, the trajectory of the vehicle can be defined as the worst-case of a predetermined position on the vehicle, such as the rear wheel, front side wing, rear side wing or a point mid-way along the length of the vehicle. In alternative embodiments, the trajectory of all or part of the vehicle body can be determined and provided on the visual display.

The invention provides a collision warning system which combines information from proximity sensors and/or cameras with predicted trajectory to provide a collision warning to the driver only when a collision is likely to occur, rather than all the time that the vehicle is near a detected obstacle.

Further, in the collision warning system of the invention, the position of detected objects is stored and updated as the vehicle moves (FIG. 2, steps 300 and 310), and therefore the position of detected objects in the proximity of the vehicle is known, even when they move out of range of the proximity sensors. Accordingly, when the system is active, the driver is provided with a continually updated and accurate visual indication of any obstacles in the proximity of the vehicle.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. A method of warning a driver of a vehicle of a predicted collision comprising:
    operating a proximity sensor to determine a position of an obstacle relative to the vehicle;
    determining a steering angle of the vehicle;
    predicting a vehicle trajectory based on the steering angle;
    identifying a collision zone on the vehicle predicted to contact the obstacle based on the vehicle trajectory and a vehicle geometry; and
    operating a visual display to indicate to the driver a position and a predicted trajectory of the collision zone.

2. The method of claim 1, further comprising operating the visual display to indicate a collision zone on the obstacle which is predicted to contact the collision zone on the vehicle.

3. The method of claim 1, further comprising operating the visual display to indicate a position on the vehicle predicted to come closest to the obstacle if no contact between the vehicle and the obstacle is predicted.

4. The method of claim 1, wherein the step of predicting a vehicle trajectory is further based on a currently selected gear of a transmission of the vehicle.

5. The method of claim 1, wherein the step of operating the visual display comprises:
    providing a plan view of the vehicle and the obstacle; and
    superimposing a path of the trajectory of the collision zone on the plan view.

6. The method of claim 5, wherein the plan view is provided as a graphical representation on a digital display screen.

7. The method of claim 5, wherein the plan view is generated at least in part from data received from at least one camera on the vehicle.

8. The method of claim 1, further comprising providing an audible warning indication if the vehicle trajectory is expected to result in a collision.

9. The method of claim 8, wherein the audible warning comprises a voice message indicating the position of the collision zone.

10. The method of claim 1, wherein the collision zone on the vehicle is on a lateral side of the vehicle.

11. A method of collision warning for a vehicle comprising:
    operating a proximity sensor to determine a position of an obstacle relative to the vehicle;
    predicting a vehicle trajectory based on a vehicle steering angle;
    identifying a collision zone on a lateral side of the vehicle predicted to contact the obstacle based on the vehicle trajectory; and
    visually indicating to a vehicle driver a position and a trajectory of the collision zone.

12. The method of claim 11, further comprising providing a visual indication of a collision zone on the obstacle which is predicted to contact the collision zone on the vehicle.

13. The method of claim 11, further comprising providing a visual indication of a position on the vehicle that is predicted to come closest to the obstacle if no contact between the vehicle and the obstacle is predicted.

14. The method of claim 11, wherein the step of predicting a vehicle trajectory is further based on a currently selected gear of a transmission of the vehicle.

15. The method of claim 11, wherein the step of visually indicating to the vehicle driver comprises:
    providing a plan view of the vehicle and the obstacle; and
    superimposing a path of the trajectory of the collision zone on the plan view.

16. The method of claim 15, wherein the plan view is provided as a graphical representation on a digital display screen.

17. Collision warning apparatus for a vehicle comprising:
    a proximity sensor for detecting an obstacle in a vicinity of the vehicle;
    a memory for storing a position of the obstacle relative to the vehicle and vehicle geometry data;
    a device for determining a steering angle of the vehicle;
    a control device configured to:
    predict a trajectory of the vehicle based on the vehicle geometry data and the steering angle;
    determine whether the vehicle will collide with the obstacle based on the trajectory of the vehicle and the position of the obstacle; and
    calculate a position of a collision zone on the vehicle and/or on the obstacle; and a visual display configured to indicate:
    the trajectory of the vehicle relative to the detected object; and
    the position of the collision zone on the vehicle and/or on the obstacle.

18. The apparatus of claim 17, further comprising a device for determining a currently selected gear of a transmission of the vehicle, and wherein the control device is configured to predict the trajectory of the vehicle based on the geometry of the vehicle, the steering angle and the currently selected transmission gear.

19. The apparatus of claim 17, wherein at least one proximity sensor is positioned on each lateral side of the vehicle.

20. The apparatus of claim 17, wherein the collision zone on the vehicle is on a lateral side of the vehicle.

\* \* \* \* \*